United States Patent [19]

Singer et al.

[11] Patent Number: 5,636,424

[45] Date of Patent: Jun. 10, 1997

[54] SAFETY SEAT

[75] Inventors: Neil C. Singer, New York, N.Y.; Steven J. Gordon, Jamaica Plain, Mass.; Christopher T. Zirps, Milton, Mass.; Massimo A. Russo, Brookline, Mass.

[73] Assignee: Massachusetts Institute of Technology, Cambridge, Mass.

[21] Appl. No.: 182,511

[22] Filed: Jan. 13, 1994

Related U.S. Application Data

[63] Continuation of Ser. No. 732,860, Jul. 19, 1991, abandoned.

[51] Int. Cl.$^6$ .................... B23P 11/00; B60N 2/42
[52] U.S. Cl. ............... 29/407.01; 29/434; 297/216.19; 364/424.055
[58] Field of Search .................. 29/404, 407, 407.01, 29/434, 407.08; 364/424.05; 297/216.19

[56] References Cited

U.S. PATENT DOCUMENTS

| | | | |
|---|---|---|---|
| 2,102,979 | 12/1937 | Smith | 297/216.19 |
| 2,335,340 | 11/1943 | Koppelman . | |
| 2,736,566 | 2/1956 | Hartl . | |
| 2,777,531 | 1/1957 | Erickson . | |
| 2,818,909 | 1/1958 | Burnett . | |
| 2,823,730 | 2/1958 | Lawrence . | |
| 2,863,496 | 12/1958 | Pinkel . | |
| 2,922,461 | 1/1960 | Braun . | |
| 2,978,273 | 4/1961 | Racine . | |
| 2,993,732 | 7/1961 | Walker . | |
| 3,112,955 | 12/1963 | Stolz . | |
| 3,357,236 | 12/1967 | McCarthy | 297/216 X |
| 3,423,124 | 1/1969 | Hewitt | 297/216 X |
| 3,427,070 | 2/1969 | Wallach . | |
| 3,452,834 | 7/1969 | Gaut . | |
| 3,556,584 | 1/1971 | Simon . | |
| 3,591,232 | 7/1971 | Simon . | |
| 3,610,679 | 10/1971 | Amato | 297/216 X |
| 3,697,128 | 10/1972 | Strien et al. . | |
| 3,731,972 | 5/1973 | McConnell . | |
| 3,802,737 | 4/1974 | Mertens . | |
| 3,858,930 | 1/1975 | Calandra et al. . | |
| 3,981,520 | 9/1976 | Pulling . | |
| 3,998,291 | 12/1976 | Davis | 297/216.19 X |
| 4,085,963 | 4/1978 | Bullerdieck . | |
| 4,249,769 | 2/1981 | Barecki . | |
| 4,349,167 | 9/1982 | Reilly . | |
| 4,634,169 | 1/1987 | Hasstedt . | |
| 4,738,485 | 4/1988 | Rumpf | 297/216 |
| 5,398,185 | 3/1995 | Omura | 364/424.05 |

FOREIGN PATENT DOCUMENTS

| | | | |
|---|---|---|---|
| 823912 | 1/1938 | France . | |
| 1163168 | 2/1964 | Germany . | |
| 2456028 | 8/1976 | Germany | 297/216 |
| 7903166 | 10/1980 | Netherlands | 297/216 |
| 1161419A | 6/1985 | U.S.S.R. . | |

*Primary Examiner*—Joseph M. Gorski

[57] ABSTRACT

The vehicle safety seat supports an occupant and includes structure interconnecting the seat and the vehicle. The interconnecting structure is adapted to constrain the seat, upon vehicle deceleration, to follow a trajectory with respect to the vehicle which substantially minimizes a cost function associated with occupant injury. In a preferred embodiment, the structure constrains the mass center and seat angle to follow trajectories which substantially minimize primarily forward motion of the occupant in the vehicle frame of reference.

6 Claims, 3 Drawing Sheets

SAFETY SEAT

This application is a continuation of application Ser. No. 732,860, filed Jul. 19, 1991, and now abandoned.

BACKGROUND OF THE INVENTION

This invention relates to vehicle safety seats for reducing injury to an occupant during a vehicle crash.

Automobile and other vehicle crashes account for numerous deaths and injuries throughout the world. Many approaches to protecting occupants during a vehicle crash have been proposed and studied. Among such approaches are active lap and shoulder belts, passive shoulder belts and air bags which inflate upon impact. Air bags, passive shoulder harnesses and active shoulder and lap belts offer some protection but often in the event of a crash an occupant "submarines" beneath the belts or air bag, thereby sustaining an injury upon impact with the vehicle's instrument panel. In "submarining" injury may additionally be caused by the lap belt sliding upwards past the occupant's hip and compressing the softer abdominal region. Lap and shoulder belt loading can also be sufficiently high during a crash to cause significant internal injuries.

There is also considerable prior art directed to seats that move with respect to the vehicle under the influence of the inertial loads resulting from the rapid deceleration of the vehicle in a crash. These prior art devices typically tilt the seat cushion upwardly while simultaneously moving the seat forward in an effort to reduce an occupant's impact with the instrument panel structure. For example, U.S. Pat. No. 5,022,707 describes a tilting seat in which the front and rear portions of the seat move upwardly with the front moving upwardly a greater amount than the rear.

SUMMARY OF THE INVENTION

None of the prior art references has sought an optimum trajectory for movement of the seat relative to the vehicle that substantially minimizes a cost function associated with occupant injury such as head acceleration or forward motion of the occupant in the vehicle frame of reference.

The vehicle safety seat according to the invention includes a seat adapted to support an occupant, and structure interconnecting the seat and the vehicle. The interconnecting structure is adapted to constrain the seat, upon vehicle deceleration, to follow a trajectory with respect to the vehicle that substantially minimizes a cost function associated with occupant injury. In preferred embodiments, the cost function is head or chest acceleration or forward motion of the occupant in the vehicle frame of reference or in the seat frame of reference. In one embodiment, the structure is adapted to constrain a reference point on the seat, such as the seat mass center, and the seat angle to follow optimum trajectories. It is preferred that total allowed forward seat travel be in the range of 2–5 inches.

In an embodiment for which the cost function is forward motion of the occupant in the vehicle frame of reference, the seat mass center moves initially downward and then upward, and the seat angle increases monotonically. The structure in this embodiment includes separate mechanisms for constraining the front and the rear portions of the seat to follow separate trajectories. A typical embodiment of the structure causes the rear portion of the seat to move downward initially and then upward, and causes the front portion of the seat to move upward monotonically. Pins sliding in slots symmetrically located on the left and right sides of the seat are suitable structures for constraining the seat trajectories. The pins should include bearings to minimize friction.

In another preferred embodiment, the seat includes damping apparatus between the seat and the vehicle for removing energy during the seat's traversal of its trajectory. In yet another embodiment of the invention, the seat includes a latching mechanism adapted to restrain the seat in an initial position. This latching mechanism is adapted to release the seat at a predetermined force level between the seat and the vehicle or at a predetermined vehicle deceleration rate. A suitable threshold deceleration rate is approximately 3 g's.

In preferred embodiments, the mass center and seat angle trajectories are approximated by nth order polynomials such as 3rd order polynomials. Optimal trajectories are computed for specified crash pulses and vehicle interiors.

In yet another aspect of the invention a method is disclosed for designing and constructing a vehicle safety seat by first establishing a model of the crash dynamics of the vehicle. A cost function is established having a relationship to occupant safety. Thereafter, trajectories for the seat mass center or other reference point on the seat and the seat angle are computed that minimize the cost function, and apparatus is selected to constrain the seat and seat angle to follow the computed trajectories.

By constraining seat motion to follow substantially optimum trajectories, substantial improvements are achieved for factors directly associated with occupant injury. Sled crash tests and computer simulations have shown substantial decreases in forward motion of occupants and head injury criteria. Lap belt loads are also significantly lowered. Reducing forward motion of an occupant reduces submarining. Importantly, the seat of the present invention operates entirely without power assist, relying on its momentum to follow the substantially optimum trajectories. While the seat of the present invention has application in an automotive context, it is to be recognized that the seat may also be used in any vehicle, including airplanes, trains, boats, etc.

DESCRIPTION OF THE PREFERRED EMBODIMENT

Figure 1:
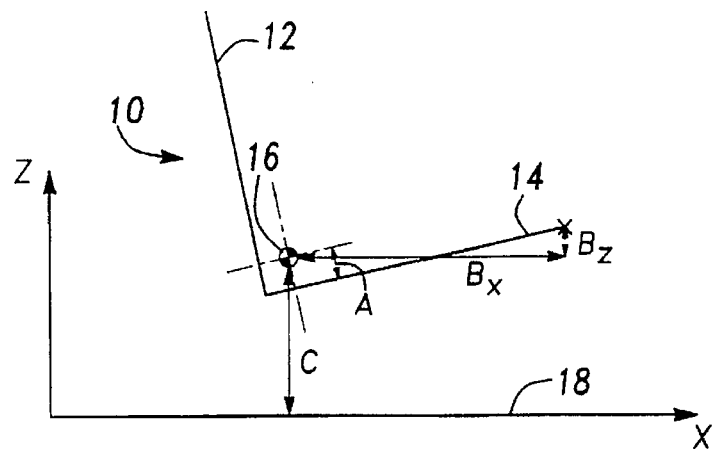
FIG. 1 is a schematic illustration of a safety seat identifying design parameters.

The applicants herein recognized that by selecting a cost function associated with occupant injury and performing an optimization, one can achieve a safety seat that can dramatically reduce injury resulting from impacts with the instrument panel or from lap and shoulder belt loading. The term "cost function" has a well defined meaning in the field of mathematical optimization. See, for example, Dantzig, George B. (1963). *Linear Programming and Extensions*, Princeton University Press, Princeton, N.J. In order to select optimum seat motion trajectories for particular vehicle types, vehicle crash dynamics were modeled. The applicants herein modified a public domain vehicle crash program to incorporate seat travel and seat angle trajectories with respect to the vehicle. The program used and modified is the Articulated Total Body Model, Version IV (ATB-IV), available from the Air Force Systems Command, Wright-Patterson Air Force Base, Ohio. The ATB-IV program was enhanced to accept geometric constraints on the relative motion of one model segment (in this instance, e.g., the seat) relative to another (in this instance, e.g., the vehicle). During the simulation additional non-working constraint forces and torques were applied by the adjacent segment to the segment-to-be-constrained so that its position is forced to be along the defined constraint path. Such a model can be used to quantify the performance of any specified seat configuration. The applicants herein have thus placed vehicle crash safety seat design on a mathematical foundation.

Generally speaking, the optimization proceeds by first finding a best straight line trajectory for seat motion and thereafter introducing curvature into the trajectory to improve results even further.

In particular, the optimization is performed in stages as follows. In a first stage, linear functions for both mass center location and seat angle are optimized by selecting an initial seat position, seat angle, and crash deceleration based on data from existing vehicles. Then the slopes of the linear seat trajectories for the position and angle functions are varied and used to construct several input files for the crash simulation. An iterative process is then used to solve for the optimally sloped linear functions which minimize a selected cost function.

The optimal linear functions are then used as starting functions for curved trajectories in a second stage of the optimization. Trial curved trajectories are constructed by fitting polynomials to several control points. The control points are moved from positions along the optimal linear trajectory and curves of various orders are least squares fitted to the control points. An iterative procedure is used to optimize the curved trajectory, including steps of moving the control points, generating fitted curves, simulating a vehicle crash with the seat constrained to the curved trajectory, and evaluating the results. Similar procedures are used for both the center of mass trajectory and the angle trajectory. This iterative procedure converges to yield curved trajectories which optimize the selected cost function.

By way of example, described in detail below, such an optimization was performed using the mass center of the seat as a reference point for describing seat motion and the total forward motion of the lower body of the seat occupant in the vehicle frame of reference was selected as a minimized cost function.

This optimization analysis resulted in mass center and seat angle trajectories which minimize a cost function such as the total forward motion in the vehicle frame of reference of the lower body of an occupant. Although the seat mass center was selected as a convenient reference point, it should be understood that any other reference point on the seat could alternatively be used. The total forward motion of the occupant's lower body with respect to the vehicle frame in a crash was selected as the cost function for the optimization, because submarining events may result in injury when the occupant encounters an instrument panel or knee bolsters or sustains high belt load injuries. Those skilled in the art will appreciate that any of a variety of other cost function criteria, such as for example head acceleration, can be employed using the techniques of this invention to design trajectories which minimize the particular cost function.

With reference now to FIG. 1, a representative or generic seat 10 was selected for calculating the optimal trajectories according to the invention. This analysis assumed a seat 10 mass of 60 pounds and an occupant (not shown) mass of 167.9 pounds. Line 12 represents the seat back and line 14 represents the seat bottom cushion surface. In this embodiment, the seat center of mass 16 was selected to be 12.99 inches above a floor 18 of a vehicle (not shown) in which the seat 10 is mounted. The center of mass 16 is 1.641 inches above the cushion surface 14. The distance from the center of mass 16 to the front of the cushion 14 was 15.505 inches and the seat was tilted at an angle θ with respect to the horizontal represented by the floor 18.

A crash pulse profile was selected for analysis. The particular crash pulse used was a composite of acceleration data from several vehicles. The cost function used in this analysis was the total motion in the x direction (i.e., in the vehicle reference frame) travelled by the lower portion of an occupant after the onset of the crash pulse. Optimization using this cost function penalizes excessive forward movement of the seat with respect to the vehicle as well as motion of the occupant with respect to the seat. The optimization results in a seat that can, in the event of a crash, move in the optimal trajectory sufficiently to reduce the movement of the seat occupant with respect to the seat, yet permits the seat to be contained within the passenger compartment. Therefore the occupant avoids injurious contact with compartment interior surfaces.

Figure 2:
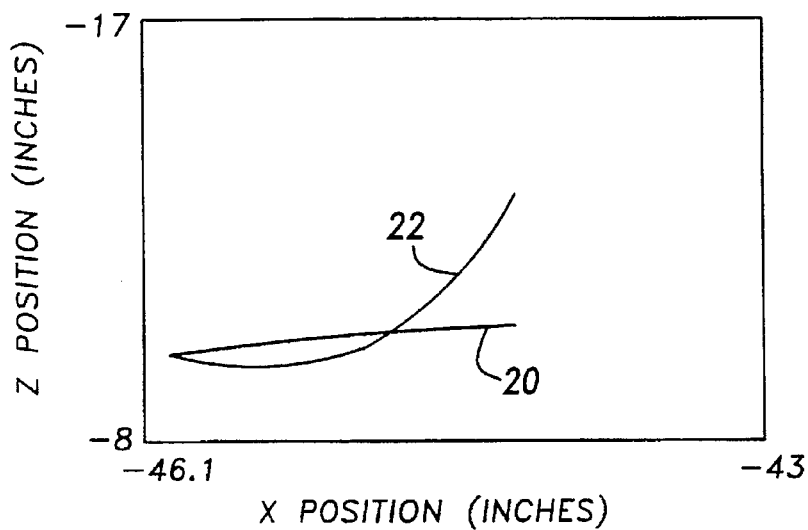
FIG. 2 is a graph of seat mass center height versus forward position of the seat.
Figure 3:
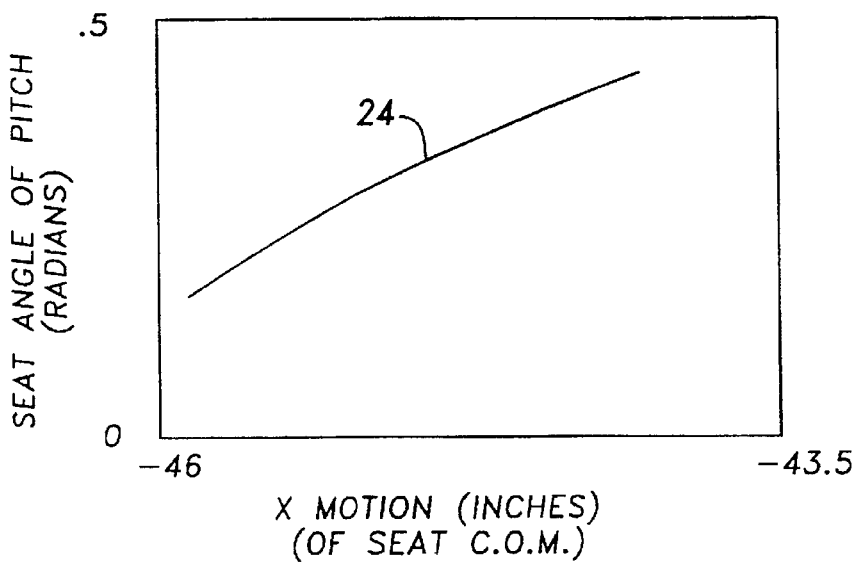
FIG. 3 is a graph of seat angle versus forward position of the seat.

With reference now to FIG. 2, line 20 represents optimal linear motion of the seat 10 center of mass upwardly (z direction) as a function of forward motion (x position). Mass center motion was then allowed to vary away from straight line 20 motion in the iterative optimization method discussed above to minimize the occupant forward motion cost function. This optimization produced a curve 22 which is substantially the optimum mass center trajectory for the seat 10 to minimize the cost function for a given set of vehicle parameters. Along with center of mass motion, the analysis also comprehended seat angle or pitch measured in radians versus x position. Curve 24 in FIG. 3 is substantially the optimum seat angle θ versus x position. The curves 22 and 24 were fitted to third order polynomials resulting in $z(x) = 1.163(x) - 0.641(x^2) - 0.2925(x^3)$, and $\theta(x) = 0.1222 + 0.1911(x) - 0.02344(x^2) + 0.00263(x^3)$. The optimum trajectory for this embodiment has the mass center initially moving downwardly followed by upward motion while the seat angle increases monotonically. This optimal motion differs markedly from the upward and forward motion of both the front and rear of the vehicle safety device described in above-mentioned U.S. Pat. No. 5,022,707.

Figure 4:
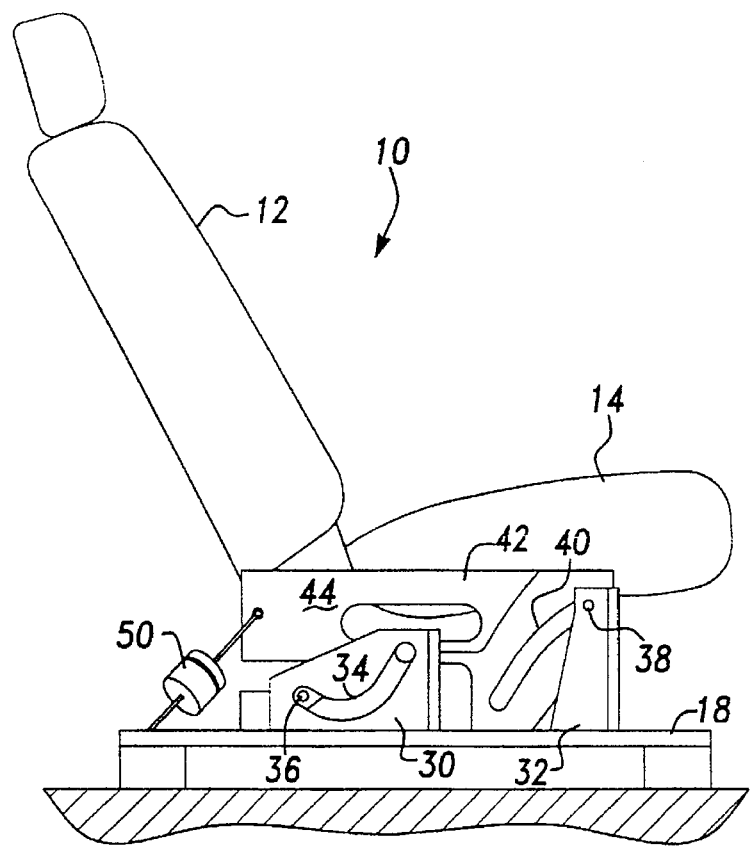
FIG. 4 is a cross-sectional view of an embodiment of the safety seat of the invention.

FIG. 4 shows an embodiment of the invention which causes the vehicle safety seat to follow the trajectories 22 and 24 of FIGS. 2 and 3. In FIG. 4 the seat 10 includes the seat cushion surface 14 and seat back 12. Mounted to the floor 18 of a vehicle is a rear structural member 30 and a front structural member 32. As will be appreciated by those skilled in the art, the rear and front structural members 30 and 32 are provided on both left and right sides of the seat. The rear structural member 30 includes a slot 34. Affixed to the seat 10 at its rear portion is a pin 36 which rides in the slot 34. It is preferred that the pin 36 include a roller or other bearing to minimize friction as the pin 36 traverses the slot 34. The front structural member 32 includes a pin 38 which should also include a roller or other type bearing to minimize friction. The pin 38 engages a slot 40 in a forward portion 42 of a seat frame 44 of the seat 10. The slot 40 is included in the forward portion 42 of the seat frame 44 to provide compactness for the overall structure. If the front slot were in the vehicle structure rather than in the seat frame, the front structure would have to extend further forwardly.

Shown schematically in FIG. 4, a dashpot or damper mechanism 50 may be added between the seat frame 44 and the vehicle floor 18 to damp the motion of the seat. The damper 50 is designed to slow the seat to a gradual stop at the end of its trajectory. The damper induced deceleration minimizes the forward motion occurring from an abrupt stop when the end of the trajectory is reached. It is also preferred that the damper be double acting so as to slow the return motion of the seat toward its original position at the end of a crash pulse if no latching mechanism is provided to hold the seat in its forward position.

Figure 5:
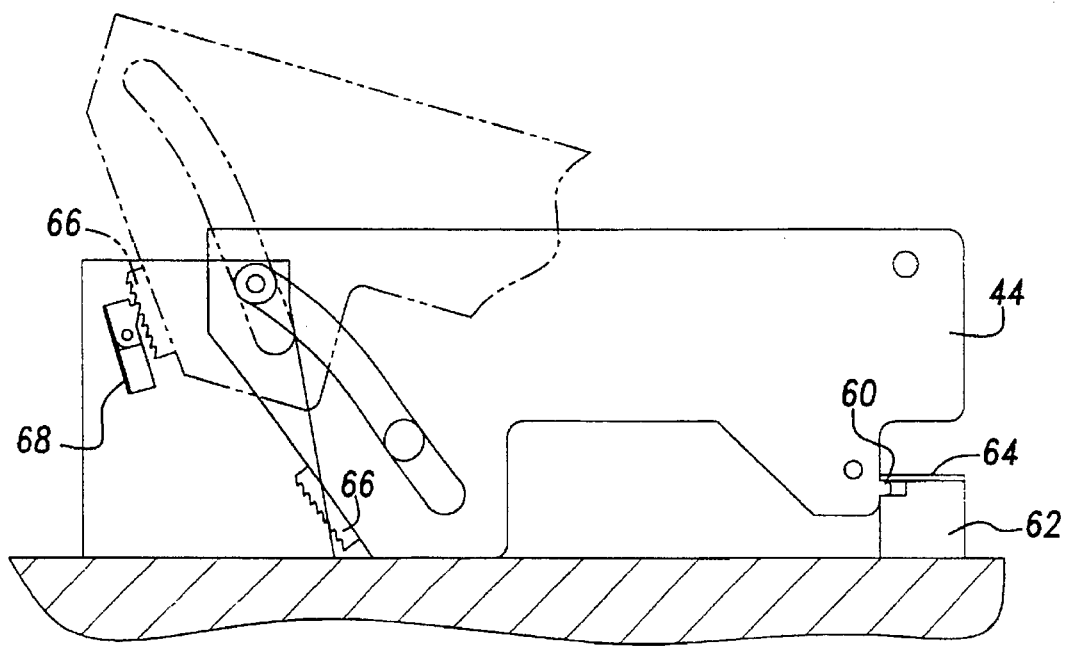
FIG. 5 is a cross-sectional view of a latch used in conjunction with the seat.

It is preferred that an initial position latching mechanism be provided to maintain the seat in its initial, fixed location until a vehicle crash occurs. It is also preferred that a postcrash latching mechanism be provided to keep the seat in its forward position following a crash event. A seat latch embodiment is shown in FIG. 5, showing both initial position latching and postcrash latching mechanisms. In FIG. 5 the front of the seat is to the left and the rear is to the right. As will be recognized by those skilled in the art, the large inertial forces acting at the seat center of mass during a frontal impact result in a high torque causing large vertical reaction forces at the rear seat supports. The initial position latching mechanism of FIG. 5 is designed to release in the presence of such vertical reaction forces. The seat frame 44 includes a release latch hook 60 which engages a release latch support 62 attached to the vehicle floor. The hook angle of the release latch hook 60 is selected to release at a predetermined deceleration rate. A seat retaining leaf spring 64 is provided to maintain the seat in its initial position during events other than high forward deceleration such as a vehicle roll over. Upon the occurrence of the preselected threshold deceleration rate, torques on the seat frame 44 will lift the seat sufficiently so that the release latch hook 60 passes over the release latch support 62 thereby releasing the seat. Additionally, a front portion of the seat frame 44 includes a ratchet rack 66 which is adapted to engage a forward latch pawl 68 attached to the vehicle. As shown in phantom, when the seat frame 44 is in its forward position, the ratchet rack 66 engages the latch pawl 68 which maintains the seat in its forward position. Because the latch mechanism of FIG. 5 is insensitive to inertial loads, seat occupant weight will not affect the latch operation so that a selected threshold for deceleration will cause the latch to release independent of occupant weight.

In operation, the seat 10 is initially latched into its initial position shown in FIG. 4. Upon the occurrence of a crash pulse, the initial position latching mechanism of FIG. 5 releases and the seat 10 begins to traverse the trajectory constrained by the motion of the pins 36 in the slots 34 and the pins 38 in the slots 40. The seat mass center drops and then rises while the seat angle increases throughout the motion. This seat motion minimizes the total forward motion of an occupant with respect to a vehicle frame of reference. Thus the occupant remains in the seat longer and is less likely either, when not restrained by a lap belt, to impact a forward portion of the vehicle passenger compartment structure and be thereby injured, or, when restrained by a lap belt, to suffer belt load induced injuries. Once the seat has reached its forwardmost position, the postcrash latch mechanism locks the seat in its postcrash position.

Both sled crash tests and computer simulations have been carried out with the seat of FIG. 4. The seat was first tested in conjunction with a shoulder belt only and dramatically reduced the tendency toward submarining as compared to a fixed seat used as a control. Subsequent tests were performed with lap belts in place. These tests resulted in significant lowering of lap belt loading. Crash test simulations employing crash sleds compared a conventional, fixed seat and the moving seat of the present invention.

Figure 6:
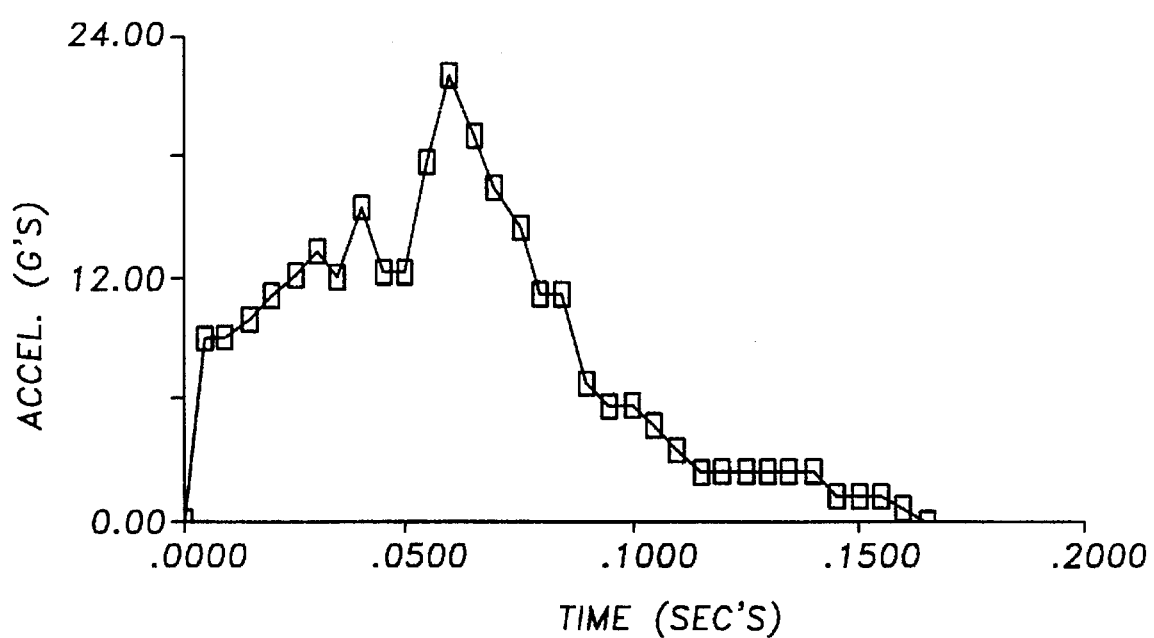
FIG. 6 is a graph of a crash pulse used in testing of the seat of the invention.

Simulations of both the moving seat and the fixed seat were conducted at a speed of 30 mph with a two-point shoulder belt as the only means of restraint, omitting the lap belt restraint to permit direct measurement of the forward motion of the lower torso. FIG. 6 is a graph of the crash pulse used in the tests. Note that a peak acceleration of 24 g's was recorded. In the case of the fixed seat the lower torso moved beyond the 19.8 inch length of the seat and onto the floor of the vehicle. The injury scores were high because submarining of the occupant occurred. The HIC score for the fixed seat case was 996.91, the HSI score was 1241.9 and the CSI score was 82.9. Maximum head acceleration was 63.402 g's and the maximum chest acceleration was 18.453 g's. The maximum force measured in the belt was 1891.37 pounds. The chest loading was low because the shoulder harness could not properly restrain the occupant.

The seat according to the present invention achieved much better scores in the simulated tests. The lower torso moved only 8.014 inches relative to the seat, which translates to only 9.796 inches relative to the vehicle. The occupant remained seated for the duration of the crash pulse. The head injury scores were considerably lower for the moving seat than for the fixed seat. For the moving seat, the HIC score was 331.33 and the HSI score was 397.19. The chest injury score, CSI, was higher for the moving seat, namely, 151.97. Maximum head acceleration was 34.543 g's and maximum chest acceleration was 25.84 g's. Maximum force in the shoulder belt was 1787.23 pounds. The chest acceleration is higher for this optimized seat configuration than for the stationary seat, because the movement of lower torso of the occupant is much less, and the occupant is properly restrained by the shoulder harness. Chest acceleration and CSI scores for both the fixed seat and the moving seat are considered low.

Sled tests were performed to verify the simulation results. In the fixed seat tests using a shoulder harness and no lap belt, the test dummy completely left the seat. In sled tests of the moving seat according to the invention, the test dummy remained within the seat and showed substantial injury score reductions. In sled tests using both shoulder harness and lap belt anchored in the seat, the lap belt loading for the moving seat was substantially lower than the lap belt loading for the fixed seat.

It is noted that the trajectories illustrated in FIGS. 2 and 3 and the slot configurations illustrated in FIG. 4 were computed for a particular crash pulse and different trajectories may result for different crash parameters. An important aspect of the present invention is the methodology disclosed herein for selecting seat center of mass and seat angle trajectories for particular vehicles, crash scenarios and cost functions. It is noted that cost functions other than total forward motion of an occupant may be used. Other appropriate cost functions are chest acceleration, head injury criteria, chest injury criteria, head excursion, pelvis motion relative to the seat, and force on the spine. It should also be recognized that more than one of these or other criteria may be combined with selected weighting functions to create a hybrid cost function. It will also be appreciated that vehicle crash simulation programs other than the ATB-IV may be used in finding optimal seat and seat angle trajectories to minimize a selected cost function.

We claim:

1. A method of making a vehicle seat for connection within a vehicle including the steps of:

modelling crash dynamics of a given seat in a specified vehicle with occupant movement on the seat during impact of the vehicle including predetermined geometry of the specified vehicle along with seat orientation and position therein, and including a given crash pulse defining predefined forces and timing of the specified vehicle during impact;

determining a seat travel trajectory for the travel of a point of the seat with respect to a predefined axis based on the crash dynamics which reduces occupant movement from the given seat;

determining a separate seat rotation trajectory for the change in angle of rotation of the seat with respect to the predefined axis based upon the modelled crash dynamics which reduces occupant movement from the given seat; and fabricating connection means for connecting the seat to the vehicle so that upon impact, the seat moves along both of the seat travel trajectory and the seat rotation trajectory with respect to the vehicle in response to the given crash pulse to reduce occupant movement.

2. The method as set forth in claim 1 further including selecting an initial linear seat travel trajectory having a predefined slope with respect to the predefined axis, and varying the slope of the travel trajectory to determine an improved travel trajectory which increase the reduction of occupant movement.

3. The method as set forth in claim 2 further including selecting an initial seat rotation trajectory of predefined slope and curve, and varying the slope and curve to determine improved angle trajectory which increases the reduction of occupant movement.

4. The method as set forth in claim 3 further including by iterating the improved travel trajectory and improved rotation trajectory by varying the slopes and curves of the trajectories and determining occupant movement based on both trajectories from the modelled crash dynamics, and selecting resulting travel and rotation trajectories which minimize occupant movement.

5. The method as set forth in claim 4 wherein said step of fabricating connection means includes constructing linkage between the seat and the vehicle which controls the seat to approximately move along the resulting travel and rotation trajectories with respect to the vehicle.

6. The method as set forth in claim 1 further including the predefined axis comprising an axis of the vehicle along a line of impact forces.

* * * * *